Nov. 3, 1964        A. C. HOFFMAN        3,155,110
RUBBER CHECK AND RELIEF VALVE
Filed Dec. 3, 1962
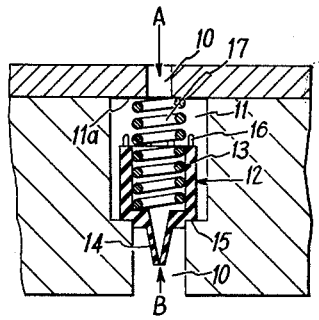
Fig. 1
PRIOR ART
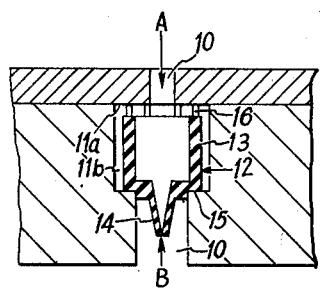
Fig. 2
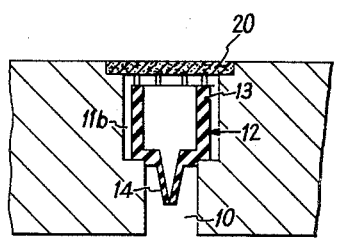
Fig. 4
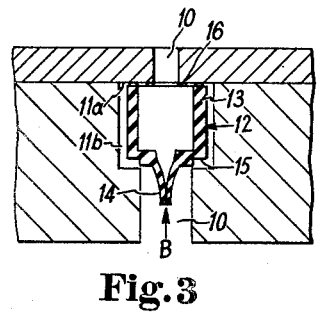
Fig. 3
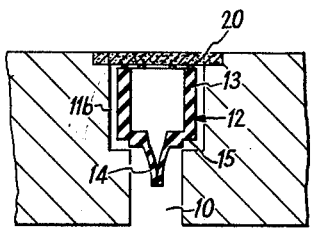
Fig. 5
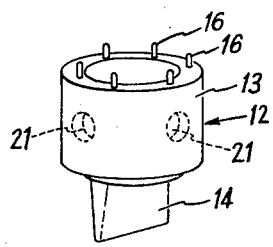
Fig. 6
Fig. 9
Fig. 7
Fig. 8
INVENTOR.
ALLAN C. HOFFMAN,
BY
ATTORNEYS.

United States Patent Office 3,155,110
Patented Nov. 3, 1964

3,155,110
RUBBER CHECK AND RELIEF VALVE
Allan C. Hoffman, Riverside, Calif., assignor to Vernay Laboratories, Inc., Yellow Springs, Ohio, a corporation of Ohio
Filed Dec. 3, 1962, Ser. No. 241,944
6 Claims. (Cl. 137—493.1)

This invention relates to a rubber check and relief valve and more particularly to a valve which is designed to permit fluid flow in one direction but to check fluid flow in the opposite direction up to a certain pressure. When this certain pressure is exceeded, the valve must be capable of relieving the pressure in the reverse direction.

Valves of the type generally outlined above are used in the master cylinder brake applications and in various other applications such as the relief of excess fuel vapor pressure in small high speed gasoline engines such as are used with outboard motors and chain saws and the like.

Valves of the general type discussed above have been provided in the past in the form of so-called rubber duck bill valves. These valves generally have comprised a hollow cylindrical portion from one end of which the duck bill portion extends and the other end of which is provided with a plurality of lugs or feet. The rubber valve member has been provided with a shoulder adjacent the base of the duck bill portion and the valve element has been pressed against an annular wall with the aforesaid shoulder seating on the wall by means of a compression spring. The compression spring was of sufficient modulus to hold the rubber valve element in position for its normal function as a check valve and the spring was designed to yield at a certain pressure to permit relief.

The use of the spring makes the valve more expensive and more complicated and it is therefore an object of the present invention to eliminate the spring of the prior art without destroying the relief feature heretofore provided by the spring.

This and other objects of the invention which will be pointed out in more detail or which will become apparent upon reading these specifications are accomplished by that certain construction and arrangement of parts of which the following will describe certain examples.

Reference is made to the drawing forming a part hereof and in which:

FIG. 1 is a cross-sectional view through a typical passage with a valve changer and duck bill valve therein according to the prior art.

FIG. 2 is a view similar to FIG. 1 showing one embodiment of the present invention with the valve in its normal position to act as a check valve.

FIG. 3 is a view similar to FIG. 2 showing position of the parts during relief under excess back pressure.

FIG. 4 is a view similar to FIG. 2 showing a different embodiment of the invention, the valve being shown in its normal checking position.

FIG. 5 is a view similar to FIG. 4 showing the valve in relief position.

FIG. 6 is an enlarged perspective view of the rubber valve element itself.

FIGURE 7 is a cross sectional view of a disc 20b comprised of foraminous material and employed in one modification of the invention.

FIGURE 8 is a cross sectional view of a disc 20c comprised of a porous metal and employed in one modification of the invention.

FIGURE 9 is a cross sectional view of a disc 20a comprised of a rigid screen and employed in one modification of the invention.

Briefly, in the practice of the invention, there is provided a rubber or rubber-like valve element comprising a hollow cylindrical body portion from one end of which a duck bill valve portion extends. It is to be understood that although the valve element has been described above as "rubber or rubber-like," any resilient or pliable material including natural or synthetic rubbers will suffice. Duck bill valves are well known in and of themselves and comprise a slit which readily opens to permit fluid flow in one direction but which closes and seals to prevent reverse flow. According to the prior art, such valves were disposed in a chamber in a fluid passage as shown in FIG. 1, wherein a fluid passage is indicated at 10 and a valve chamber is indicated at 11. The valve element itself is generally indicated at 12 and comprises the cylindrical hollow body portion 13 and the duck bill portion 14. An annular shoulder is provided as at 15, and normally the shoulder 15 seats against the shoulder formed by the lower end of the chamber 11 and the passage 10.

At the end opposite the duck bill 14 there are provided a plurality of lugs or feet 16 and a compression spring 17 bearing against the inside of the valve member 12 and against the upper end 11a of the chamber 11 holds the valve in the position shown.

It will be clear that fluid may flow in the direction of the arrow A but may not flow in the direction of the arrow B. If, however, the pressure in the direction B exceeds the design pressure of the valve as determined by the strength of the spring 17, the valve member 12 will be forced upwardly so that fluid may pass in the direction B around the outside of the cylindrical body 13 and out through the upper portion of the passage 10. The purpose of the lugs or feet 16 is to provide for flow even if the valve 12 is pushed up against the upper end 11a of the chamber 11.

According to the present invention, the spring 17 is eliminated without eliminating its function. This is accomplished by utilizing the lugs 16 to serve the function of the spring 17 and it will be clear that the number and dimensions of the lugs 16 may be designed to meet any desired pressure relief conditions. Thus, as shown in FIG. 2, the valve element 12 is substantially identical with that of FIG. 1 and the same reference numerals have been used to identify its several parts. The length of the chamber 11 has been shortened so that the chamber 11b of FIG. 2 is of a length to hold the valve axially in position with the lugs 16 bearing against the upper end 11a of chamber 11b while the shoulder 15 is seated as before. Again fluid may flow in the direction A but will be checked in the direction B. When the pressure acting in the direction B exceeds the designed pressure relief point of the valve, the valve element 12 is pushed upwardly collapsing or distorting the lugs 16 as shown in FIG. 3 and permitting flow in the direction of the arrow B around the outside of the cylindrical body 13 and through the space between the lugs 16 and the upper portion of the passage 10. It will be seen that the valve of FIGS. 2 and 3 functions in the same way as that of FIG. 1 but that the spring has been entirely eliminated.

The embodiment of FIGS. 4 and 5 is similar to that of FIGS. 2 and 3 except that in this instance the upper end of the chamber 11b is constituted by a disc 20. The disc 20 is of pervious material and it may be either a porous metal or a rigid screen or a foraminous disc of metal or other suitable rigid material. The operation of the embodiment of FIGS. 4 and 5 is exactly like that of FIGS. 2 and 3 except that the pervious disc 20 has been used as the end 11a of the chamber 11b. This disc is useful in applications where it is necessary to prevent dust or other particles from entering the passage 10.

FIG. 6 shows the valve in greater detail and there are shown in broken lines a number of holes 21 in the cylindrical wall portion which may be useful in providing quicker relief or even to insure relief in the event that the lugs 16 should be mashed flat and there would be inadequate clearance between the upper end of the cylindrical body 13 and the end of the chamber.

In the foregoing description and in the claims the term "rubber" or "resilient" is intended to be inclusive of any resilient or pliable material including rubber-like materials such as the various natural and artificial rubbers.

While the invention has been described in some detail it will be clear that this description is exemplary only and that no limitation is intended which is not specifically set forth in the following claims.

What is claimed is:

1. In combination with a fluid passage through which fluid must flow without check in one direction, and in which fluid flow in the opposite direction must be checked up to a certain pressure, but must be permitted above said certain pressure, a chamber in said passage and a resilient valve element disposed in said chamber, said valve element comprising a hollow cylindrical wall portion in said chamber, and having a shoulder, and a duck bill portion extending from said shoulder over said cylindrical wall portion into said passage in said one direction, the other end of said cylindrical wall portion being provided with a plurality of spaced lugs, said shoulder and lugs respectively bearing normally against the ends of said chamber, said lugs being adapted to yield above said certain pressure to permit axial movement of said valve element to unseat said shoulder from the end of said chamber to permit flow around the outside of said valve element and between said lugs in said opposite direction.

2. In combination with a fluid passage through which fluid must flow without check in one direction, and in which fluid flow in the opposite direction must be checked up to a certain pressure, but must be permitted above said certain pressure, a chamber in said passage and a resilient valve element disposed in said chamber, said valve element comprising a hollow cylindrical wall portion having a by-pass aperture therethrough in said chamber, and having a shoulder, and a duck bill portion extending from said shoulder over said cylindrical wall portion into said passage in said one direction, the other end of said cylindrical wall portion being provided with a plurality of spaced lugs, said shoulder and lugs respectively bearing normally against the ends of said chamber, said lugs being adapted to yield above said certain pressure to permit axial movement of said valve element to unseat said shoulder from the end of said chamber to permit flow around the outside of said valve element and between said lugs and through the by-pass aperture in said cylindrical portion in said opposite direction.

3. In combination with a fluid passage through which fluid must flow without check in one direction, and in which fluid flow in the opposite direction must be checked up to a certain pressure, but must be permitted above said certain pressure, a chamber in said passage and a resilient valve element disposed in said chamber, said valve element comprising a hollow cylindrical wall portion in said chamber, and having a shoulder, and a duck bill portion extending from said shoulder over said cylindrical wall portion into said passage in said one direction, the other end of said cylindrical wall portion being provided with a plurality of spaced lugs, said shoulder and lugs respectively bearing normally against the ends of said chamber, that end of said chamber against which said lugs bear being constituted of a disc of pervious material, said lugs being adapted to yield above said certain pressure to permit axial movement of said valve element to unseat said shoulder from the end of said chamber to permit flow around the outside of said valve element and between said lugs in said opposite direction.

4. The combination according to claim 3, wherein said disc is a metallic screen.

5. The combination according to claim 3, wherein said disc is a foraminous plate.

6. The combination according to claim 3, wherein said disc is of porous metal.

References Cited by the Examiner

UNITED STATES PATENTS

| | | | |
|---|---|---|---|
| 1,515,999 | 11/24 | Clark | 137—525 |
| 1,637,821 | 8/27 | Heideman | 137—525 XR |
| 2,193,261 | 3/40 | Thomson | 137—550 XR |
| 2,642,261 | 6/53 | Gates | 137—550 XR |
| 2,718,237 | 9/55 | Matasovic | 137—550 XR |
| 2,931,385 | 4/60 | Carlisle et al. | 137—550 XR |

M. CARY NELSON, *Primary Examiner.*

MARTIN P. SCHWADRON, *Examiner.*